United States Patent
Chamot et al.

[11] Patent Number: 6,085,984
[45] Date of Patent: Jul. 11, 2000

[54] SAFETY CARTRIDGE FOR THERMOSTATIC MIXER TAP

[75] Inventors: Jean Chamot, Arpajon; Christian Macé, Vert le Grand, both of France

[73] Assignee: Vernet S.A., Arpajon Cedex, France

[21] Appl. No.: 09/247,080

[22] Filed: Feb. 9, 1999

[30] Foreign Application Priority Data

Feb. 11, 1998 [FR] France .................... 98 01639

[51] Int. Cl.⁷ .................................... G05D 12/13
[52] U.S. Cl. ............................. 236/12.2; 236/100
[58] Field of Search ................ 236/12.2, 12.21, 236/12.22, 100

[56] References Cited

U.S. PATENT DOCUMENTS

| | | | |
|---|---|---|---|
| 3,765,604 | 10/1973 | Trubert et al. | 236/12.2 |
| 4,029,256 | 6/1977 | Dauga | 236/12.2 |
| 4,760,953 | 8/1988 | Trubert | 236/12.2 |
| 5,979,777 | 11/1999 | Ems | 236/12.2 |

FOREIGN PATENT DOCUMENTS

| | | |
|---|---|---|
| 0 187 378 | 7/1986 | European Pat. Off. . |
| 0 258 129 | 3/1988 | European Pat. Off. . |
| 2 656 060 | 6/1991 | France . |
| 474 791 | 6/1969 | Switzerland . |
| 560 343 | 3/1975 | Switzerland . |
| 97 36219 | 10/1997 | WIPO . |

OTHER PUBLICATIONS

M.U. No. MN 93 U000011 (Mar. 17, 1993), Structure De Cartouche Pour Mitigeur Thermostatique.

*Primary Examiner*—William E. Tapolcai
*Attorney, Agent, or Firm*—Wenderoth, Lind & Ponack, L.L.P.

[57] ABSTRACT

A safety cartridge for thermostatic mixer taps includes a thermostat carrying a slide having two valves for shutting off respective flows of hot and cold water. A region of the thermostat is housed in a piston having a part which is guided by a reversibly releasable guide mechanism adapted to guide the piston as long as the valve for shutting off the flow of hot water is not in contact with its seat, to eliminate the guidance when the valve bears on the seat, to allow misalignment of the piston, of the thermostat and of the slide so that the valve is pressed against and sealed to the seat, and to re-establish the guidance when the valve leaves its seat.

10 Claims, 2 Drawing Sheets

SAFETY CARTRIDGE FOR THERMOSTATIC MIXER TAP

BACKGROUND OF THE INVENTION

1. Field of the Invention

The invention concerns mixer taps for mixing two incoming flows of fluids at different temperatures to constitute a single outgoing flow of fluid at a constant temperature that can be varied independently of the respective pressures and temperatures of the two incoming flows of fluid and of the flowrate of the outgoing fluid within a particular range of pressures and flowrates.

It is more particularly concerned with the construction of a cartridge fitted inside such mixer taps, in particular controlling a mobile regulator slide that adjusts the incoming fluid flows in accordance with the required outgoing fluid temperature.

2. Description of the Prior Art

In mixer taps known per se intended in particular for sanitary installations (showers, baths with or without showers, etc), to obtain the most stable possible and precise regulation the travel of the regulator slide rarely exceeds one millimeter for a (conventional) adjustment range from 20° C. to 60° C. As a result a variation of 1° C. is produced by a travel of 0.025 mm, which enables great accuracy and a reliable setting within the comfortable range from 35° C. to 40° C. (corresponding to a travel of 0.125 mm). However, the required accuracy and reliability, together with good temperature stability, are obtained at the cost of accurate guidance of the slide.

What is more, to conform to safety standards, an interruption in the cold water supply must cut off the hot water supply, only extremely low leakage being tolerated. The slide must therefore be able to position itself freely on its seat.

The guidance needed to obtain accuracy, reliability and stability, which constitutes an impediment to free positioning of the slide on its seat, is therefore a disadvantage from the point of view of safe operation of the mixer tap.

What is more, the hot water supply must be cut off extremely quickly. The reaction speed of the assembly depends on the one hand on that of the thermostats used in this type of application, usually wax-based and open to improvement, and on the other hand on that of the intimate mixing of the incoming flows of water, which is also open to improvement. The invention aims to achieve a reaction time of less than one second when the cold water supply is cut off.

It is also necessary for the cartridge to be easy and quick to fit into the body of the mixer tap, which is not always the case in mixer taps known per se.

SUMMARY OF THE INVENTION

One aim of the invention is to remedy the drawbacks of mixer taps known per se and to create a mixer tap that easily conforms to safety standards, that is easy and quick to manufacture, to assemble and to repair, and which nevertheless is of moderate cost.

To this end, the invention concerns a thermostatic cartridge for mixer taps including a hollow outside envelope having one or more openings constituting a first inlet for a first flow of fluid and one or more openings constituting a second inlet for a second flow of fluid with an inside passage through it discharging through an orifice constituting an outlet for a mixed fluid obtained by mixing of the fluid flows, an expandable thermostat, two valve seats each adjacent one inlet, a slide having two valves each cooperating with one of the seats to isolate each inlet from the outlet or to make it communicate therewith, fixed to a part of the thermostat that is mobile as a function of its temperature, a piston in which a region of the thermostat is housed and which, for a given adjustment, remains fixed as long as the seat adjoining the first inlet is not in contact with its valve, and a spring member urging the piston in the direction that moves the valve toward its seat, wherein the piston has at least one region sliding of which is guided by reversibly releasable guide means adapted to guide it as long as the seat adjoining the first inlet is not in contact with its valve, to eliminate the guidance when the valve bears on the seat to allow misalignment of the piston, of the thermostat and of the slide so that the valve is pressed against and sealed to the seat and to re-establish the guidance when the valve leaves its seat.

In accordance with one feature of the invention, a region of the thermostat is surrounded by a member for generating turbulence, and the member for generating turbulence is preferably a ring disposed in the region of the outflow for the mixed fluid, having a passage through it leaving a generally annular space between the inside surface of its wall and the thermostat, said passage widening in the direction toward the exterior of the cartridge, longitudinal splines and a spot facing at its end facing toward the inside of the cartridge.

In accordance with another feature of the invention, the reversibly releasable guide means comprise an end region of the piston entering a hole in a partition transverse to the longitudinal axis of the envelope, a guide washer threaded around that end region and a seat provided for the guide washer in the partition.

In accordance with a further feature of the invention, said thermostat includes a container for a mass of an expandable material and having flats or depressions and raised portions determining a cross-section with a shape having at least two lobes.

Also in accordance with a feature of the invention, said periphery of said envelope has two flats and said mixer tap includes a body having a slot into which is inserted a clip having substantially rectilinear branches on respective opposite sides of said envelope facing said flats, said periphery of said envelope also having a groove allowing insertion of a tool for extracting said clip.

BRIEF DESCRIPTION OF THE DRAWINGS

Other features and advantages of the invention will emerge from the following description of embodiments of the invention given by way of non-limiting example and with reference to the accompanying drawings, in which.

DESCRIPTION OF THE PREFERRED EMBODIMENTS

Figure 1:
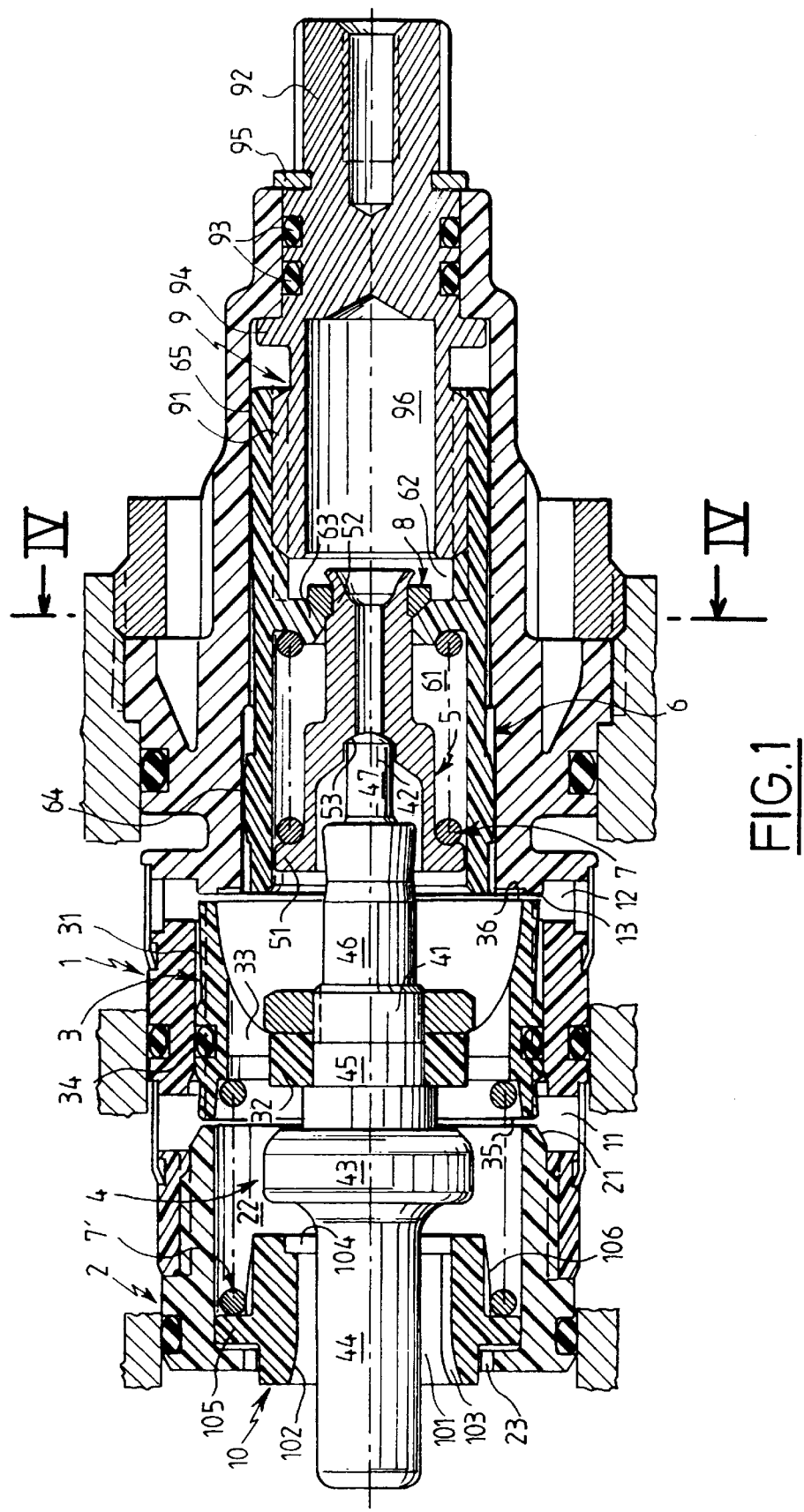
FIG. 1 is a longitudinal section of a thermostatic cartridge in accordance with the invention.

Like many mixer tap cartridges known per se, the cartridge shown in FIG. 1 has a hollow outside envelope 1 that is elongate and has a general external shape that is approximately circular about a longitudinal central axis.

An inside passage extends through the envelope along its longitudinal axis, also being generally circular and concentric with that axis.

The wall of the envelope 1 has at least two lateral longitudinally offset openings 11, 12 passing radially through it to connect the volume outside the envelope to its internal passage; the openings can be in the form of two circular holes or extend along circumferential arcs in the wall of the envelope 1; for example, the envelope has two series of four circumferential arc-shaped openings 11, 12 regularly distributed around its periphery, the two series being separated in the longitudinal direction of the envelope by a distance of a few millimeters to a few centimeters depending on the dimensions of the cartridge.

One of the openings 11, or one of the series of openings 11, in the wall of the envelope constitutes a hot water inlet and the other opening 12, or the other series of openings 12, constitutes a cold water inlet. Each inlet can be provided with a filter, for example in the form of a perforated stainless metal strip which here is inserted into a groove in the envelope.

Like certain mixer tap cartridges known per se, the cartridge of FIG. 1 includes a bush 2 fixed coaxially into the internal passage in the envelope 1, for example by being screwed into a screwthreaded end portion thereof. A passage through the bush is centered on the longitudinal axis of the envelope; its end within the envelope preferably projects at least slightly into the volume delimited by the extension toward the interior of the passage in the envelope of the contour of the opening 11 or of the series of openings 11 nearest the end of the envelope into which it is screwed, which constitutes the hot water inlet. This end of the bush near the openings 11 is in the form of an annular seat 21 for an annular valve for adjusting the hot water flowrate (see below). Facing the end of the bush 2 made in the form of a seat, the envelope 1 or the annular part inserted into the envelope has a shoulder that is also in the form of an annular seat 13 and which is preferably level with or projects slightly into the volume delimited by the extension toward the interior of the passage in the envelope of the contour of the other opening 12, or of the other series of openings 12, which constitutes the cold water inlet. The seat near the openings 12 is adapted to receive an annular valve for adjusting the cold water flowrate.

The envelope 1 and the bush 2 are sealed in the mixer tap body by means of O-rings disposed in grooves at their periphery.

Again as in cartridges known per se, the cartridge of FIG. 1 includes a slide 3 adapted to slide longitudinally in the envelope 1 between the two seats 21, 13. The slide comprises two concentric rings 31, 32 connected by ribs extending radially and longitudinally and defining between them passages 33 extending longitudinally from one end of the slide to the other. The outside ring 31 fits in the passage in the envelope and is sealed to it by an annular seal 34; its length is generally greater than the distance between the two openings 11, 12 or the two series of openings 11, 12. The inside ring 32 is threaded over and fixed around an approximately central mobile part 41 of an expandable thermostat 4 having an approximately circular elongate general outside shape, passing through the slide 3 and extending beyond the two seats 21, 13. To this end, the mobile part 41 has a shoulder and a screwthreaded region of smaller diameter, for example, and the ring 32 of the slide 3 is then held pressed against the shoulder by a nut screwed onto the screwthreaded region. An annular space 22 between the thermostat 4 and the inside surface of the bush provides communication between the longitudinal passages 33 of the slide and the exterior of the cartridge. The two ends of the outside ring 31 of the slide are in the form of annular valves 35, 36 adapted to cooperate with the facing seat 21, 13 so that the valve can be pressed against the seats to prevent the corresponding flow of water to the outlet of the cartridge.

When a flow of hot water reaches an opening 11, or a series of openings 11, in the envelope and a flow of cold water reaches the other opening 12, or the other series of openings 12, the two flows are mixed more or less intimately within the slide 3 and the bush 2, around the thermostat 4. The quantities of hot water and cold water entering are determined by the position of the slide 3 between the two seats 21, 13, which defines the flow sections for the two flows according to whether the valves are nearer or farther away from their respective seats, so determining the temperature of the "mixed" water leaving the cartridge around the mobile part 41 of the thermostat, through the orifice through which the inside passage of the envelope discharges.

However, in cartridges known per se, a fixed part 42 (to be more precise the normally fixed part) of the thermostat, which is an end part of the thermostat 4 opposite the bush 2, beyond the hot water and cold water inlets, is guided and centered in the passage in the envelope. This guidance and centering provide the accuracy, reliability and stability of the temperature adjustment. On the other hand, as already mentioned, it is also the source of the drawback from the safe operation point of view referred to in the preamble to this application.

To be more precise, in cartridges known per se, in contrast to the situation of the invention as shown in FIG. 1, the fixed part 42 of the thermostat is always guided and centered in a housing in a piston sliding along the central axis of the envelope and itself accurately guided throughout its travel; the piston is acted on by a first coil spring urging it toward the corresponding seat at the hot water inlet so as to urge the mobile part 41 of the thermostat and the slide toward their position in which that inlet is closed, and a piston abutment the position of which can be modified in accordance with the required temperature of the outgoing mixture; the thermostat 4, generally a flange 43 of the mobile part thereof near the part to which the slide 3 is fixed, is acted on by a second spring which is less powerful than the first and urges it in the opposite direction to hold its fixed end part 42 in the housing in the piston.

Accordingly, in such cartridges known per se, when the slide 3 is in a position chosen to obtain a required mix of hot water and cold water, if the flow of cold water is unintentionally reduced or cut off the temperature of the thermostat 4 increases which increases its length, the mobile part 41 entraining the slide as far as its location in which it cuts off the flow of hot water, in other words abutted against the bush 2 (hot water end), and if the temperature continues to rise despite this and the thermostat continues to expand, the mobile part being immobilized, the normally fixed part 42 moves in the opposite direction to the mobile part, entraining the piston against the force exerted by the first spring which urges it toward the hot water end, the first spring therefore serving as an overtravel spring until, the temperature falling, the thermostat returns to its initial position, being guided and centered at all times by its normally fixed end 42.

In the cartridge of the invention shown in FIG. 1 the fixed part 42 of the thermostat is also inserted into a housing in an overtravel piston 5 sliding along the central axis of the envelope 1. However, the piston 5 and the fixed part 42 of the thermostat 4 are adapted to remain centered in the passage only in routine operation of the mixer tap in order to preserve the required accuracy, reliability and stability of adjustment, i.e. as long as the thermostat has not expanded beyond the point necessary for the slide 3 to bear against the hot water end of the bush 2, but can depart from a central position to prevent it from impeding perfect contact between the seat 21 and the valve 35 if the thermostat continues to expand.

To be more precise, in accordance with the invention, the shoulder in the form of an annular seat 13 is preferably passed directly into the envelope 1 and it is a bush 6 housed in the internal passage of the envelope that contains the sliding piston 5 and a coil spring 7 urging it toward the hot water inlet.

Also in accordance with the invention, instead of the piston 5 being urged by the spring 7 toward an abutment whose position can be modified in accordance with the required temperature, it is the position of the bush 6 that can be modified in accordance with the required temperature. To this end the bush 6 is guided to slide in translation along the inside passage in the envelope 1 and is divided into two longitudinally successive chambers 61, 62 which are separated by a partition 63 transverse to the longitudinal axis of the envelope and which has a central hole the function of which is explained hereinafter.

The chamber 61 on the slide side houses the piston 5 and its return spring 7; the return spring is guided externally by the lateral inside surface of the chamber 61 and internally at one end by the periphery of a boss on the partition 63 with the central hole in it, whereas its opposite end bears against an end base 51 (slide end) of the piston 5 which is guided externally by the lateral inside surface of the chamber 61. The piston 5 has a body extending longitudinally from the base 51 toward the end of the bush 6 opposite the slide 3 and passing through the central hole in the transverse partition. The end region 52 of the body of the piston opposite the base is guided to slide in a reversibly releasable manner by virtue of the fact that it is surrounded by a guide washer 8 bearing against the partition on the side thereof opposite the chamber 61 at the slide end, as explained below, and against a shoulder on the outside surface of this end region. The part of the body of the piston 5 that is connected to the base 51 guides the return spring 7 internally over part of its length and the smaller diameter region surrounded by a washer 8 is joined to this guide part for the spring by a shoulder which abuts against the partition. A central longitudinal passage through the piston 5 opens at the same end as the base 51 into a chamber containing the fixed part 42 of the thermostat and possibly a portion of the mobile part thereof. The domed, for example hemispherical, end of the fixed part bears against a region of the piston that provides the transition between this chamber of the piston and a smaller part of its central passage. The end wall 53 of this transition region has a rounded, for example spherical dome, shape and opens into the chamber with a frustoconical shape. The circular periphery of the base 51 also has a domed shape in section. The second spring 7', which is adapted to push the thermostat 4 against the rounded end wall 53 forming the seat of the transition region of the central passage in the piston, is here generally cylindrical in shape; it does not operate directly on the thermostat 4, but against a shoulder on the inside surface of the outside ring 31 of the slide 3.

The chamber 62 of the bush 6 separated from the previous one by the partition 63 has an internal screwthread adapted to cooperate with an outside screwthread on a rod 91 of a screw 9 for adjusting the required temperature, the head 92 of which is outside the cartridge at the end opposite the mixed fluid outlet. The head 92 is splined so that it can be rotationally coupled to an operating knob (not shown) fixed to it by a longitudinal central screw. An unthreaded part of the shank 91 of the adjuster screw 9 connects the screwthreaded part to the head of the screw; this part has a region which fits inside the internal passage in the envelope 1, a seal being provided between the wall of the envelope and this region by seals 93 that are substantially O-rings. The outside diameter of this region is slightly greater than that of the head of the screw. The unthreaded part of the shank of the screw also has, near the screwthreaded part, a flange 94 which abuts against the shoulder in the inside passage in the envelope 1, and near the head, outside the envelope when the flange abuts on the shoulder, a groove to receive a stop washer 95 such as a circlip to prevent movement in translation of the screw 9. The adjuster screw 9 has a longitudinal cylindrical blind chamber 96 coaxial with the internal passage in the envelope, opening opposite the piston 5. The guide washer 8 is crimped around the end of the overtravel piston 5 and shaped so that it is pressed against a seat provided for it in the partition 63 between the two chambers 61, 62; the seat is frustoconical and widens in the direction toward the adjuster screw 9, as is the periphery of the facing region of the washer 8. Thus the washer 8 can be reversibly released from its seat to eliminate guidance of the piston temporarily.

The bush 6 is guided for movement in translation along the inside passage in the envelope 1 by virtue of the fact that the facing surfaces of these two parts have splines in the region around the chamber 61 for the piston 5.

In accordance with the invention, the region of the outer ring 31 of the slide 3 which fits in the inside passage in the envelope and which is sealed by a seal 34 that is approximately an O-ring has a slightly outwardly domed shape in longitudinal section; likewise a region of the bush 6 near the seat 13 adjoining the cold water inlet, preferably the central part of the top of the spline 64, and only a short region 65 of the relatively long bush 6 fits in the inside passage in the envelope, near the adjuster screw 9. The slide 3 can therefore take up a position in which its longitudinal axis is slightly inclined to the longitudinal axis of the central passage in the envelope 1 although it continues to be sealed into the envelope and the risks of the bush 6, which is guided only near its ends, becoming wedged are minimized.

The normal operation of the cartridge is similar to that of cartridges known per se and the various positions of the adjuster screw 9 in a given adjustment range correspond to the same number of bearing locations of the piston 5 for the thermostat 4; for appropriately calculated cartridges those locations correspond to the same number of stable states of the total length of the thermostat and thus to the same number of combinations between the partially closed states of the cold water and hot water inlets. On the other hand, if in a state that may be stable or not, following unintentional cutting off of the cold water supply or excess hot water supply, the thermostat 4 expands, the slide 3 moves toward the seat 21 on the hot water side and its corresponding valve 35 can bear on that seat if the temperature of the mixed water rises sufficiently. If the temperature is such that the thermostat 4 continues to expand, its normally fixed part 42 moves in turn and pushes the piston 5 back in the bush 6 against the force of its return coil spring 7, which lifts the washer 8 carried by the piston away from the partition 63 of the bush. Thus the piston is no longer guided at its normally fixed end and the valve 35 of the slide can be pressed against and sealed to its seat 21, preventing even minimal flow of hot water, all the more easily in that the outside ring 31 of the slide 3 is domed, the seats 53 of the piston 5 for the normally fixed end of the thermostat 4 is rounded and the circular periphery of the base 51 of the piston is domed, which allows misalignment, for example inclination, of the longitudinal axes of the piston 5 in particular, of the thermostat 4 and of the slide 3 relative to that of the envelope 1. When the thermostat 4 contracts, the piston 5 is moved back toward its initial position by its return spring 7 and the washer 8 comes into contact again with its seat in the partition 63, the recentering of the various parts being facilitated by the rounded shapes already mentioned and by the frustoconical shape of the washer 8 and its seat; this re-establishes guidance of the piston.

The cartridge outlet bush 2 is fitted with a member 10 for generating turbulence around the thermostat so that mixing occurs very quickly and as homogeneously as possible as long as there is a flow of hot water and a flow of cold water. The member for creating turbulence is a ring inserted into the end of the passage through the bush at the greater distance from the slide 3, through which the thermostat 4 projects out of the envelope. The passage 101 through the ring 10 has a portion 102 widening in the direction toward the outside of the envelope 1 and defines a generally annular space between the inside surface of its wall and the thermostat 4; in addition to the portion 102 which widens, this inside surface has longitudinal splines 103 regularly distributed around its circumference. The inside surface of the ring on the side of the ring toward the inside of the envelope has a circular spot face 104 with a smooth peripheral wall extending the bottom of the splines.

The ring has an outside flange 105 which bears against the outlet end wall of the bush 2, which has four notches 23 at 90° to each other. Toward the outside of the envelope, the outside surface of the ring 10 is cylindrical and smooth and its diameter is slightly less than that of the orifice in the bush; toward the inside of the envelope 1, its outside surface has low ribs 106 decreasing in height toward its end. These ribs and the flange 105 on the ring provide a support for the coil spring 7' which holds the normally fixed part of the thermostat against the piston 5 and which to this end is pressed against a shoulder on the inside surface of the outside ring of the slide.

Because of the particular shape of the inside surface of the outlet ring 10, water leaving the cartridge and surrounding the thermostat is subject to turbulence which quickly achieves a homogeneous mixture.

Generally speaking, it is advantageous for the water inlets to be far away from the outlet so that the thermostat registers its temperature uniformly by virtue of the turbulence produced by the ring 10 and encouraging mixing of cold water and hot water; however, it is also necessary to retain the possibility of generating a high flowrate, which leads to a compromise between turbulence and flowrate.

Given the importance, with regard to the homogeneity of the mixture, of the position of the thermostat in the flow of cold water-hot water, that location can be determined by computer calculation. It is therefore possible to obtain from a thermostat with a very short reaction time a virtually instantaneous but extremely accurate correction of the mixture.

Figure 2A:
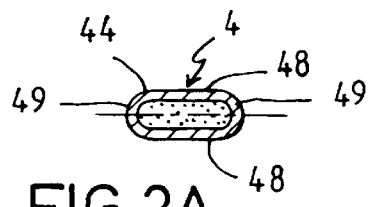
FIGS. 2A and 2B are cross-sections of a wax container for two embodiments of a thermostat particularly suitable for incorporation into a cartridge in accordance with the invention.
Figure 2B:
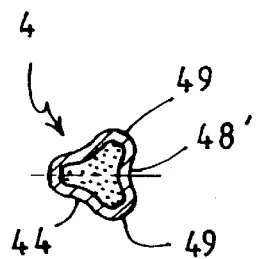
Figure 3:
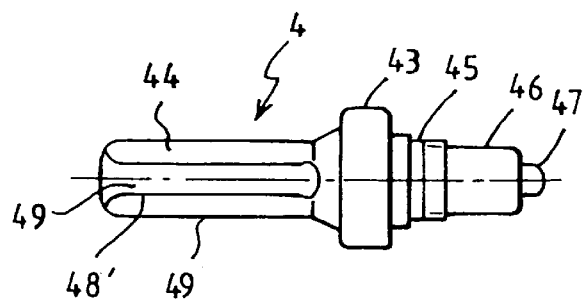
FIG. 3 is an external view of the thermostat shown in cross-section in FIG. 2B.
Figure 4:
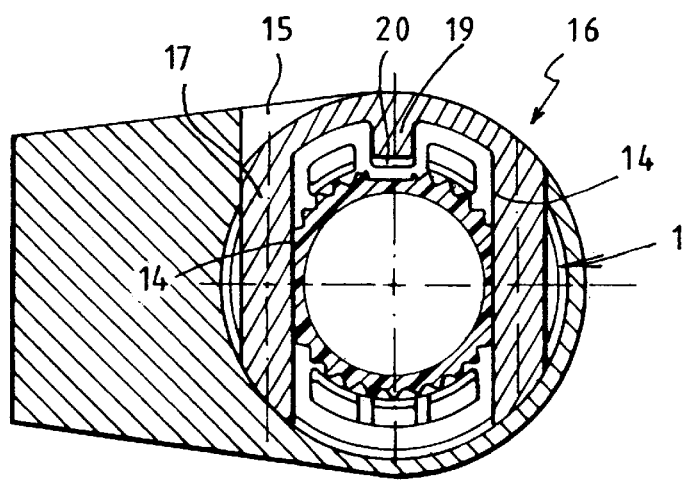
FIG. 4 shows in cross-section taken along the line IV—IV in FIG. 1 a variant of the method of mounting a cartridge in accordance with the invention in a mixer tap body shown in FIG. 1.

For the response time of the thermostat to be very short, the component can advantageously have a particular shape, like those shown in FIGS. 2A, 2B and 3, rather than the conventional shape.

Conventional thermostats include a metal container 44 of generally cylindrical shape, one end of which is closed and the opposite end of which expands to form the flange 43, and a sheath 45 that is also generally cylindrical with a central passage and a base accommodated in the flange of the container which is crimped around the base. The cylindrical part of the container 44 is filled with a mass of expandable wax and the base of the sheath has in its face that faces the mass of wax a housing for a disk-shaped flexible diaphragm closing off the central passage in the sheath at the container end. A piston 47 housed inside the passage in the sheath tracks movement of the central region of the diaphragm, the end of this piston opposite the diaphragm projecting out of the sheath by a greater or lesser amount depending on the volume occupied by the wax and therefore on its temperature. A tubular protective bellows 46 surrounds a part of the sheath and of the piston, its ends being immobilized in grooves in the periphery of those two parts; this bellows, in the form of a rolling flexible membrane tracks movements of the piston without elastic deformation.

Because the container 44 has a circular cross-section the central region of the mass of wax is at a relatively very great distance from the lateral surface of the container, and since wax is a poor conductor of heat, rapid variations in the temperature of the container wall are transmitted to these remote regions with a significant time delay, which is a drawback with regard to safe operation of the cartridge.

To remedy this drawback, in the cartridge in accordance with the invention, the thermostat is preferably essentially different in that the periphery of the container 44 has two parallel flats 48 or, in the circumferential direction, a succession of depressions 48' and raised portions, produced for example by deformation by pressure, defining a cross-section with lobes, for example at least two lobes 49 as shown in FIG. 2A, and preferably three lobes 49 as shown in FIGS. 2B and 3, or possibly more lobes.

Under these conditions, the central part of the mass of wax is close to the periphery of the container 44 and the quantity of wax, which is a poor conductor of heat, is small so that the response time of the thermostat is significantly shortened.

In this case, the container 44 is initially made with a circular cross-section and is then partially filled with wax. The flange of the container is then crimped around the base of the sheath which is fitted with its diaphragm in a vacuum so that there are no air pockets in the container, after which the container is subjected to the pressure deformation operation to form the flats 48 or the depressions 48' and the raised portions delimiting the lobes 49 of the section of the container.

Although in the foregoing detailed description of the thermostats the piston is described as mobile relative to the container, the sheath, etc, in many cartridges known per se and in the cartridge in accordance with the invention it is the piston that is normally fixed and the other members that move in the cartridge, and the movements referred to are clearly relative movements of the various parts of the component 4.

What is more, like some mixer tap cartridges known per se, the cartridge in the invention can be screwed into the mixer tap body; however, fixing can be made fast and easy by instead providing in the periphery of the envelope 1 two parallel and diametrally opposite flats 14 near the end of its inside passage where the adjuster screw 9 emerges and, facing them in the body of the mixer tap, a slot 15 with approximately planar walls passing through it on one side only, to enable the insertion of a flat clip 16. The flat clip is similar to a circlip but has parallel and substantially rectilinear branches 17 on respective opposite sides of the envelope facing the flats; to prevent inadvertent separation of the clip 16, the branches 17 can have facing studs in the region of their free end. Alternatively, separation of the flat clip can be prevented by a screw (not shown) inserted into a screwthreaded hole in the body and bearing against the flat clip; the clip 16 can equally have a tongue 19 extending between its branches in the same direction thereas and equidistant therefrom, and the envelope 1 can have in its outside surface a longitudinal groove 20 to house the tongue 19 extending as far as the free end of the envelope and equidistant from the flats 14. The length of the tongue is then slightly less than the depth of the groove, with the result that the clip can be extracted by inserting the end of a screwdriver blade under the tongue, from outside the mixer tap body, to raise the tongue by levering against the bottom of the groove.

Fitting the cartridge into the body of the mixer tap and removing it therefrom are therefore fast and in particular simplified.

What is claimed is:

1. A thermostatic cartridge for mixer taps including a hollow outside envelope having one or more openings constituting a first inlet for a first flow of fluid and one or more openings constituting a second inlet for a second flow of fluid with an inside passage through it discharging through an orifice constituting an outlet for a mixed fluid obtained by mixing of said fluid flows, an expandable thermostat, two valve seats each adjacent one inlet, a slide having two valves each cooperating with one of said seats to isolate each inlet from said outlet or to make it communicate therewith, fixed to a part of said thermostat that is mobile as a function of its temperature, a piston in which a region of said thermostat is housed and which, for a given adjustment, remains fixed as long as said seat adjoining said first inlet is not in contact with its valve, and a spring member urging said piston in the direction that moves said valve toward its seat, wherein said piston has at least one region sliding of which is guided by reversibly releasable guide means adapted to guide it as long as said seat adjoining said first inlet is not in contact with its valve, to eliminate said guidance when said valve bears on said seat to allow misalignment of said piston, of said thermostat and of said slide so that said valve is pressed against and sealed to said seat, and to re-establish said guidance when said valve leaves its seat.

2. A thermostatic cartridge as claimed in claim 1 wherein a region of said thermostat is surrounded by a member for generating turbulence.

3. A thermostatic cartridge as claimed in claim 2 wherein said member for generating turbulence is a ring disposed in the region of the outflow for said mixed fluid, having a passage through it leaving a generally annular space between the inside surface of its wall and said thermostat, said passage widening in the direction toward the exterior of said cartridge, longitudinal splines and a spot facing at its end facing toward the inside of said cartridge.

4. A thermostatic cartridge as claimed in claim 1 wherein said slide comprises two concentric rings joined together and has passages between said two rings, the outside ring includes said two valves, which are annular, said seats for said valves extend annularly on respective opposite sides of said slide, and the inside ring is fixed around said thermostat.

5. A thermostatic cartridge as claimed in claim 1 wherein said reversibly releasable guide means comprise an end region of said piston entering a hole in a partition transverse to the longitudinal axis of said envelope, a guide washer threaded around that end region and a seat provided for said guide washer in said partition.

6. A thermostatic cartridge as claimed in claim 5 wherein said seat in said partition for said washer and said washer are frustoconical in shape and the end of the region of said thermostat that is housed in said piston has a domed shape while the end wall of the region of said piston that bears against said end of said thermostat has a rounded shape.

7. A thermostatic cartridge as claimed in claim 1 including a bush fixed in said envelope and having said seat near said first inlet and wherein said envelope includes said seat near said second inlet and another bush sliding in said inside passage in said envelope, said other bush including a chamber for said piston and a return spring for said piston, and a chamber separated from said chamber for said piston by a transverse partition and having an internal screwthread adapted to cooperate with an external screwthread on a temperature adjuster screw.

8. A thermostatic cartridge as claimed in claim 1 wherein said thermostat includes a container for a mass of an expandable material and having flats or depressions and raised portions determining a cross-section with a shape having at least two lobes.

9. A thermostatic cartridge as claimed in claim 1 adapted to be housed in a mixer tap body wherein the periphery of said envelope has two flats adapted to cooperate with a fixing member inserted into at least one opening in said mixer tap body.

10. A thermostatic cartridge as claimed in claim 9 wherein said periphery of said envelope has two flats and said mixer tap includes a body having a slot into which is inserted a clip having substantially rectilinear branches on respective opposite sides of said envelope facing said flats, said periphery of said envelope also having a groove allowing insertion of a tool for extracting said clip.

\* \* \* \* \*